_United States Patent_ [19]

Marsh et al.

[11] 4,378,442

[45] Mar. 29, 1983

[54] POLYSULPHIDE SEALANTS

[76] Inventors: Andrew J. Marsh, 35 Mill Rd.; Terence F. Watkins, 3 Lime Grove, both of Leighton Buzzard, Bedfordshire, England

[21] Appl. No.: 359,008

[22] Filed: Mar. 17, 1982

[51] Int. Cl.$^3$ ............................................. C08L 95/00
[52] U.S. Cl. ..................................... 524/66; 252/430; 528/374; 528/388; 528/373; 525/537
[58] Field of Search .......................... 252/430; 524/66; 528/374, 388, 373; 525/537

[56] References Cited

U.S. PATENT DOCUMENTS 3,586,660  6/1971  Sakata et al. .......................... 528/374
3,748,313  7/1973  Bulbenko et al. ...................... 528/374

Primary Examiner—Melvyn I. Marquis
Attorney, Agent, or Firm—Caesar, Rivise, Bernstein & Cohen, Ltd.

[57] ABSTRACT

A hardener for a polysulphide sealant comprises an inorganic peroxide and according to the invention includes as a cure control agent a naphthenate e.g. copper naphthenate and/or a phenolic compound e.g. cresylic acid.

10 Claims, No Drawings

POLYSULPHIDE SEALANTS

The invention relates to polysulphide sealants and in particular to cold poured polysulphide sealants. Such materials comprise a base and hardener which are mixed together on site and then cold poured to seal a joint in a roadway or runway. Such materials are well known and standards have been set for their use see e.g. British Standard BS 5212, March 1975, "Cold poured joint sealants for concrete pavements" and United States Federal Specification SS-S-200D.

When the sealant is made by mixing the base and hardener there is a time interval during which the mix must remain sufficiently liquid to be cold poured. This is called the "pot life". Once the pot life is exceeded the sealant has set cured or gelled hard and can only be broken up by mechanical means.

To control the rate of cure of the polysulphide base and hardener it is usual to include an inorganic peroxide in the hardener. The rate of cure may be controlled by adjustment of the particle size or the inorganic peroxide or by the use of an additional accelerator mechanism e.g. sulphur or alkaline conditions. It has not proved possible to use such system where the polysulphide base is extended by a pitch since the rate of cure is already too fast. The omission of the accelerator is not satisfactory since the properties of the sealant deteriorate.

It has now been discovered that the use of certain materials as set control agents for the inorganic peroxides enables an increase in the pot life of polysulphide sealants, especially those which are pitch-extended. Such control agents not only increase the pot life without significantly affecting the other properties of the sealant but their use can offer improvements.

According to one aspect of the invention there is provided a hardener composition comprising an inorganic peroxide characterised by the presence of a cure accelerator therefor comprising a metal salt of a naphthenate and/or a cure retarder therefor comprising a phenolic compound.

In the case of a cure accelerator, a preferred salt is copper naphthenate; cobalt naphthenate may be used instead. The naphthenic acid does not seem to function like the salt and this may be because of the pH of the environment caused by its presence. The concentration of the naphthenate salt is preferably from about 1 part to about 5 parts per 100 parts of the inorganic peroxide equivalent to about 0.01 to 0.05 parts of the hardener+base mixture. An advantage of the use of the naphthenate salt is that it tends to increase the resilience of the sealant in addition to controlling the pot life; while we do not wish to be limited by this theory we believe that this may be due to the promotion of increased polymer crosslinking. A further advantage of the use of the salt is its ability to break down the thixotropic nature of metal oxide dispersions so improving pourable systems.

The phenolic compounds tend to act as cure retarders and may be selected from a wide range of available phenolic compounds. Different phenolic compounds tend to have differing effects on the rate of cure of the system. This will depend on the concentration of the phenolic compounds and the temperature; in general we prefer to use a phenolic compound which at a low concentration say 0.2 to 0.3% by weight of the peroxide will increase the pot life to about 30 minutes, preferably longer. Preferred are cresylic acid, tertiary butyl catechol and phenol itself. These have the advantage of being readily mixable with the other ingredients of the hardener composition and the sealant.

Both cure agents may be present together.

The inorganic peroxide is preferably lead peroxide. Other known ingredients may be present in the hardener composition. The base may be a polysulphide and is preferably a pitch-extended polysulphide.

The invention includes a method of making a sealant comprising mixing a polysulphide base with a hardener of the invention selected so that the mix will have a pot life of about 30 minutes or more. The invention further includes the formed sealant.

The sealant may be used to seal a joint in concrete runways and roadways. The mixed base and hardener will have a pot life of up to 45 minutes or more, dependent on temperature. By virtue of the extended pot life the base and hardener may be mixed at a convenient location and then portions brought to the places where they are needed. The sealant may be poured or for narrow gaps a caulking gun may be used.

The invention is illustrated by the following Examples in which all parts are by weight.

EXAMPLE I

A base was made up by mixing together the following ingredients:

| | |
|---|---|
| blended polysulphide resins | 510 |
| solvent | 30 |
| sulphur | 2 |
| liquid coal tar | 330 |
| defoamer | 2.4 |
| filler, fine grade | 60 |

The base had a specific gravity of 1.21 and viscosity when measured on a Brookfield Viscometer using needle 5 and spindle 4 as follows: 310 poise at 21° C., 300 poise at 23° C. and 270 poise at 25° C.

A hardener was made up by mixing together the following ingredients:

| | |
|---|---|
| chlorinated liquid paraffin | 216.5 |
| lead peroxide | 36.3 |
| lead stearate | 10 |
| solvent | 17.7 |
| fine filler | 216.5 |
| copper naphthenate | 1.5 |

The hardener had a specific gravity of 1.90.

46 parts of the base were mixed with 38 parts of the hardener. The mix had a pot life of 40 minutes. A test piece was tested and the following results were obtained.

| (a) | Federal specification SS-S-200D | |
|---|---|---|
| | Test | Result |
| | Tack off | pass |
| (b) | Pointed penetrometer | 7.5 mm. |

These results show that the sealant will meet the requirements of BS 5212 and Federal Specification SS-S-200D with the advantage of an extended pot life.

EXAMPLE II

The method of Example I was repeated using 0.5 parts of copper naphthenate in the hardener. The sealant had a pot life of around 30 minutes and passed the tack off test and had a reading of 7.5 mm on the pointed penetrometer test.

EXAMPLE III

The method of Example I was repeated at 40° C. and a pot life of 20 minutes was obtained.

EXAMPLE IV

The method of Example I was repeated but omitting the lead stearate from the hardener and equally good results were obtained.

EXAMPLE V

The method of Example I was repeated using the hardener there specified but substituting for the copper naphthenate the ingredients set out in Table 1 below which also shows the results obtained.

In the tests, resilience is measured in percentage recovery; the higher values denote a higher level of resilience. The tack off test is an indication of the rate of cure throughout the mass of the sealant sample; to be acceptable for the Federal specification the tack off time to touch should not exceed 12 hours following mixing.

The results in Table I show that the use of copper naphthenate and/or cresylic acid increase pot life and, at lower doses the agents do not affect the tack off time or resilience.

TABLE I

| Composition | | Test Results | | | |
|---|---|---|---|---|---|
| copper naph-thenate | cresylic acid | resilience % recovery 24 hours | pot life mins | pointed penetro-meter test (mm) | tack off to touch (mins) |
| 0.01 | 0 | 96 | 8 | — | 60 |
| 0.01 | 0.37 | 98 | 11 | 56 | 60 |
| 0.01 | 0.42 | 97.5 | 13 | 55 | 60 |
| 0.01 | 0.5 | 95.5 | 15 | 55 | 60 |
| 0.01 | 0.7 | 90 | 35 | — | 150 |
| 0 | 0 | 97 | 8 | — | 60 |
| 0 | 0.37 | 99 | 17 | 57 | 60 |
| 0 | 0.42 | 96 | 19 | 64 | 60 |
| 0 | 0.5 | 95 | 39 | 61 | 60 |
| 0 | 0.7 | 88 | 50 | — | 240+ |

EXAMPLE VI

The method of Example V was repeated using tertiary butyl catechol and phenol in a concentration of 0.2% of the total system and the following results were obtained.

TABLE II

| Agent | resilience % recovery | pot life | penetration |
|---|---|---|---|
| t-butyl catechol with copper naphthenate | 90 | 17 | 46 |
| without copper naphthenate | 87 | 15 | 43 |
| phenol with copper naphthenate | 90 | 14 | 64 |
| without copper naphthenate | 92 | 11 | 64 |

We claim:

1. A hardener composition for reaction with a polysulphide base to form a sealant, the hardener composition comprising an inorganic peroxide and a cure control agent for controlling the rate of cure, in which the cure control agent is selected from the group of a cure accelerator or a cure retarder or both, and the cure accelerator is a metal salt of napthenate, and the cure retarder is a phenolic compound.

2. A composition according to claim 1, in which the cure accelerator is selected from copper naphthenate and cobalt naphthenate.

3. A composition according to claim 2, in which the concentration of the naphthenate salt is from about 1 part to about 5 parts per 100 parts of the inorganic peroxide.

4. A composition according to claim 1, in which the cure retarder is a phenolic compound which is selected so as to increase the pot life of a mixture of the polysulphide base and hardener to about 30 minutes.

5. A composition according to claim 4, in which the phenolic compound is cresylic acid, tertiary butyl catechol or phenol.

6. A composition according to claim 5, in which the phenolic compound is present in a concentration of about 0.2% by weight of the mixture.

7. A composition according to any preceding claim, in which the inorganic peroxide in the hardener composition is lead peroxide.

8. A composition according to any of claims 1 to 6, in which the polysulphide base is a pitch-extended polysulphide base.

9. A method of making a sealant having an extended pot life comprising mixture together a polysulphide base and a hardener composition therefor, the hardener composition comprising an inorganic peroxide and a cure control agent for controlling the rate of cure of the base and hardener, in which the cure control agent is selected from the group consisting of a cure accelerator and a cure retarder or both, and the cure accelerator is a metal salt of a naphthenate and the cure retarder is a phenolic compound.

10. In the art of controlling the rate of cure of a polysulphide base and a hardener therefor, the hardener comprising an inorganic peroxide, the improvement which consists in extending the pot life of the mixture of base and hardener by including in the hardener composition a cure control agent selected from the group consisting of a cure accelerator and a cure retarder or both, and the cure accelerator is a metal salt of a naphthenate and the cure retarder is a phenolic compound.

* * * * *